Sept. 15, 1959     C. F. CARTER     2,904,221
MACHINE FOR DISPENSING LIQUIDS INTO CONTAINERS
Filed Sept. 6, 1957     5 Sheets-Sheet 1

INVENTOR.
Clarence F. Carter
BY
Burns, Doane, Benedict & Irons
ATTORNEYS

INVENTOR.
*Clarence F. Carter*
BY
*Burns, Doane, Benedict & Irons*
ATTORNEYS

Sept. 15, 1959 C. F. CARTER 2,904,221
MACHINE FOR DISPENSING LIQUIDS INTO CONTAINERS
Filed Sept. 6, 1957 5 Sheets-Sheet 4

INVENTOR.
Clarence F. Carter
BY
Burns, Doane, Benedict & Irons
ATTORNEYS

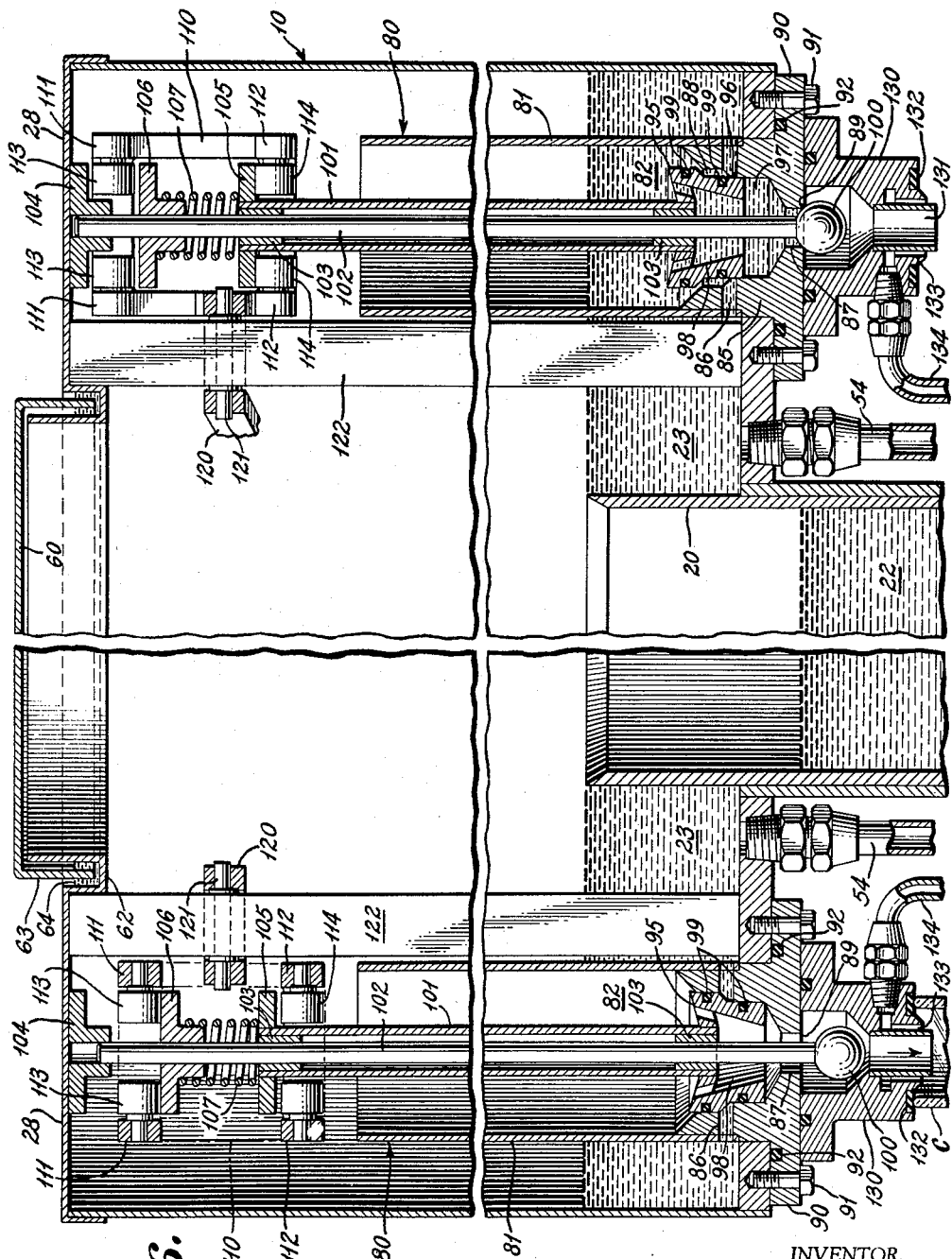

2,904,221

MACHINE FOR DISPENSING LIQUIDS INTO CONTAINERS

Clarence F. Carter, Danville, Ill.

Application September 6, 1957, Serial No. 682,463

12 Claims. (Cl. 222—146)

This invention relates to machines for filling containers with liquid materials. More specifically, it is concerned with an automatic filling machine of the rotary multistation type to sequentially fill containers with a measured volume of liquid as the containers successively pass through the machine.

A particular feature of the invention is the provision of a liquid filling machine to accommodate liquids which by their nature are preferably refrigerated during the filling operation. In liquid filling machines handling liquid materials under refrigeration, one problem encountered is the possibility of freezing the dispensing valves, resulting in erratic or complete failure of operation. A further difficulty encountered in refrigerated liquid filling, particularly in more or less continuous operations, is the formation of frost on the refrigerated liquid dispensing nozzle where it is exposed to ambient humid atmosphere. These problems are overcome by the structure of the instant invention.

Another particular feature of this invention is concerned with the provision of a liquid filling machine wherein the premeasured volume of liquid may be dispensed into the container to be filled either solely by gravity flow or by gravity flow assisted by vacuum interiorly of the container. Where such a vacuum filling operation is attempted, difficulty may be encountered in freeing the filled container from its cooperative engagement with the dispensing nozzle. Accordingly, the instant invention incorporates structure to insure automatic release of the container vacuum prior to its removal from the filling station.

It is a principal object of this invention to provide an improved filling apparatus for dispensing a measured quantity of liquid into the containers to be filled which is universally adaptable in dispensing liquid materials which are either refrigerated or heated durng the filling operation.

It is another principal object of this invention to provide a liquid filling apparatus to enable dispensing a premeasured volume of liquid into the containers being filled by utilization of either gravity flow or vacuum assisted gravity flow.

It is another object of this invention to provide a filling apparatus usable in gravity filling of refrigerated liquids where frosting of the dispensing nozzle is effectively precluded during the filling operation.

It is a further object of this invention to provide an automatic liquid filling apparatus with vacuum assisted filling, wherein the vacuum is automatically released by the valving action of the apparatus prior to the point of removal of the filled containers from the apparatus.

It is also an object of this invention to provide an improved valve assembly for use in the individual dispensing units of a rotary multistation liquid filling machine wherein the valve assembly is simply and effectively operated by a single cam track in response to rotary movements of the filling machine.

It is another object of this invention to provide a valve assembly in a rotary multistation liquid filler, as described in the above object, wherein the valve members controlling the inlet and outlet to the liquid measuring chamber are spring biased toward closing position, and wherein a single yoke cooperates with operating elements carried by the valve members to effect, as desired, alternate opening of the inlet and outlet.

The above and more specific objects of this invention will be apparent from the following description given in conjunction with the accompanying drawings which illustrate, merely by way of example, a preferred embodiment of the invention and wherein:

Figure 6 is a cross-sectional view showing two of the dispensing units in action.

Figure 1:
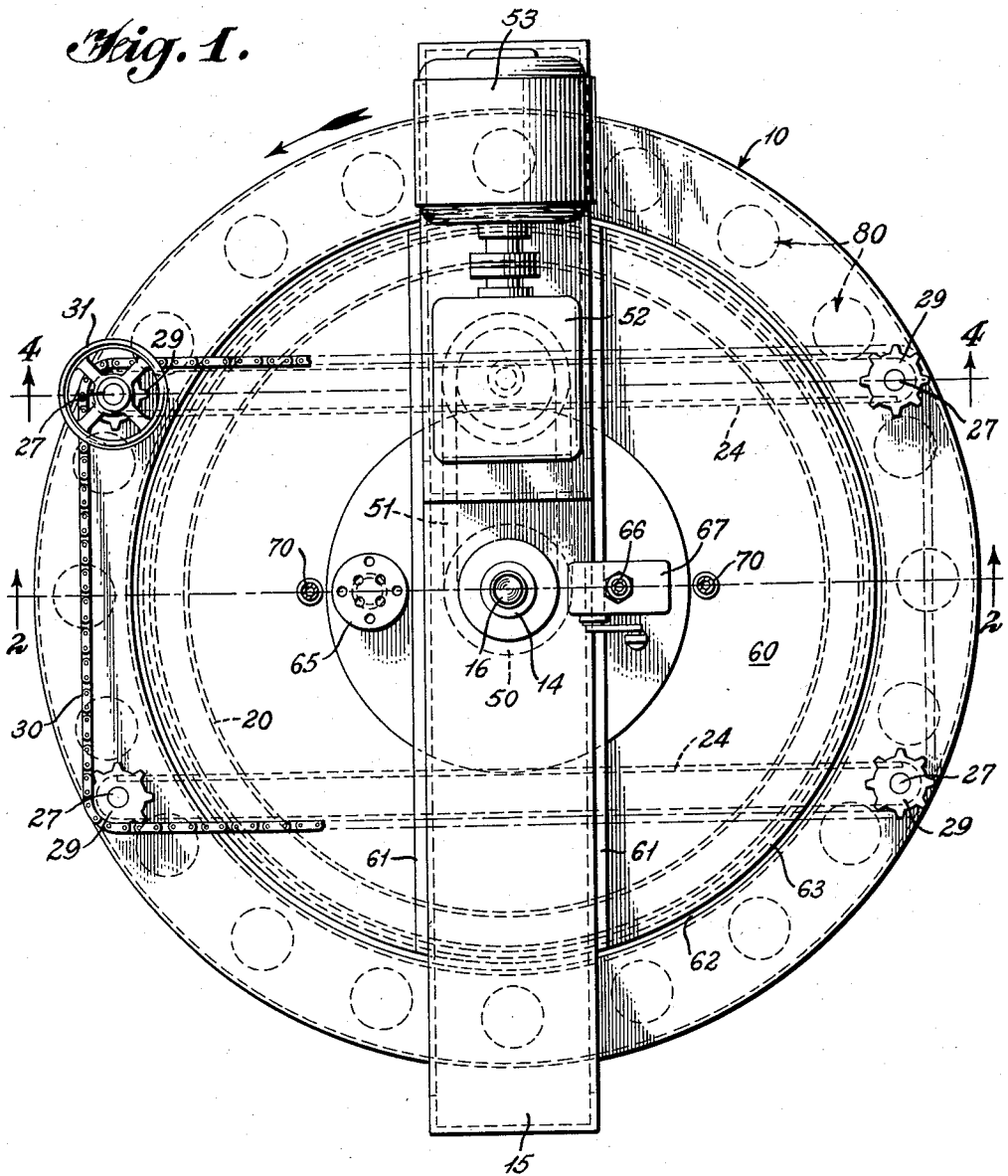
Figure 1 is a top plan view of the rotary multistation liquid filling machine of this invention, omitting details of the container feed and container removal mechanisms and other conventional auxiliary structures utilized in conjunction with the machine specifically illustrated.
Figure 2:
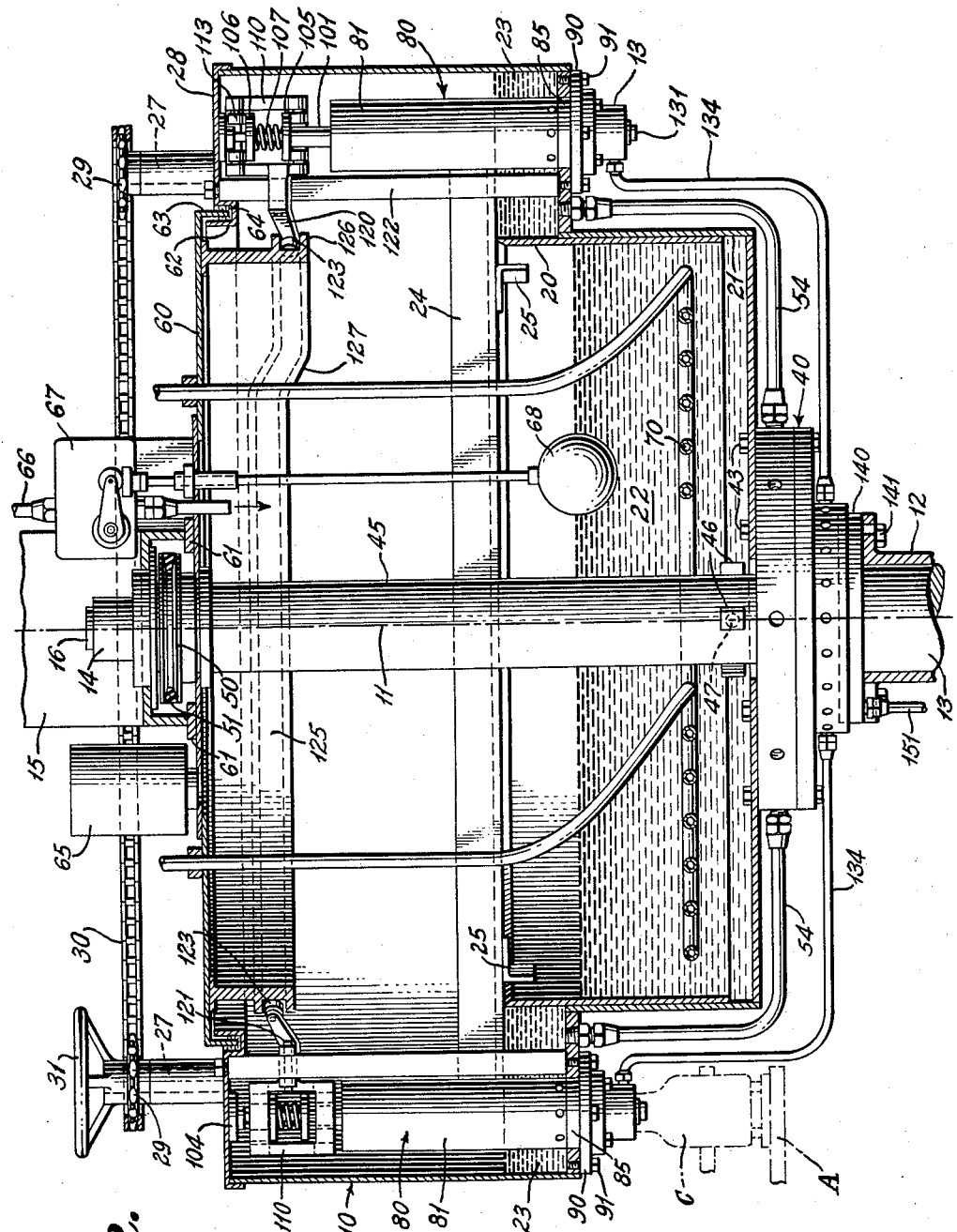
Figure 2 is a cross-sectional view taken on line 2—2 of Figure 1.

Referring to Figures 1 and 2, there is shown the general overall structure of the rotary multistation liquid filling machine of this invention. Such machine includes a tank 10 mounted to rotate about a vertical axis 11. The rotation mounting for the tank is only generally illustrated as including a stationary sleeve 12 surrounding a vertical support shaft 13 and a stationary bearing 14 carried by a transverse channel frame member 15 rotatably mounting the upper end of a center column 16. The structure of this mounting is more clearly shown in Figure 3. It will be readily recognized that any suitable rotation supporting framework may be employed to rotatably mount the tank 10 and parts carried thereby.

The rotary multistation liquid filling machine provides a plurality of individual filling stations, twenty such stations being shown in Figure 1, merely by way of example. As noted hereinabove, the mechanism for moving containers into each station as the filling machine rotates and the complementary mechanism for moving the containers out of each station after the container is filled, and as the filling machine continues to rotate, are not shown, these mechanisms being conventional and forming no part of the instant invention. There is shown in phantom view on Figure 2 a support platform A to position a container C with reference to the dispensing nozzle at each filling station. As is well known in the rotary filling machine art, the container to be filled is positioned and carried along with the dispensing nozzle as the machine rotates to effect container filling.

Any suitable means (not shown) may be employed to effect controlled rotation of tank 10 in synchronization with the container feed-in and removal mechanism. Such a drive for rotating tank 10 may be suitably connected through shaft 13

Figure 4:
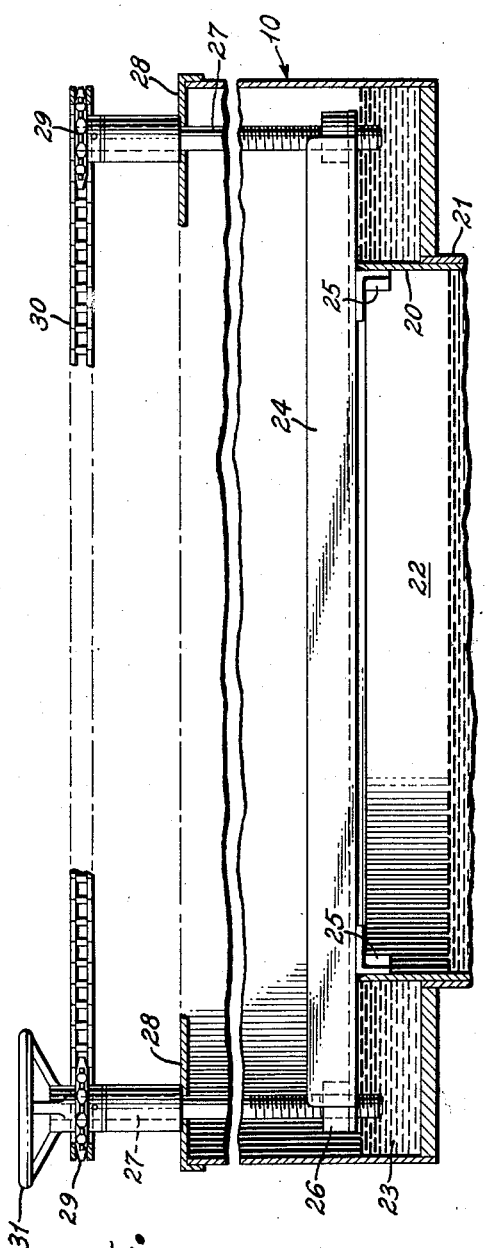
Figure 4 is a detail sectional view taken on line 4—4 of Figure 1 with certain parts omitted for clarity of illustration.

Tank 10 has a cylindrical member 20 which is vertically slidable along the cylindrical wall surface 21 of the tank. The upper end of member 20 forms a weir dividing the tank into a main liquid reservoir 22 and an annular liquid compartment 23. Parallel transverse elements 24 are secured as by clips 25 to the upper end of cylindrical member 20. Elements 24 extend outwardly overlying compartment 23 and are provided at their outer ends with internally threaded bushings 26, as shown more clearly in Figure 4. Four externally threaded rods 27 extend vertically down through the top annular wall portion 28 of tank 10 and threadably engage with bushings 26. The upper ends of rods 27 have secured thereto sprockets 29. Sprocket chain 30 extends between and cooperates with each of the four sprockets 29.

A suitable handwheel 31 is connected to the upper end of one of the rods 27 to effect suitable rotation of such rod. It will be readily appreciated that by appropriate rotation of handwheel 31, each of the rods 27 will be rotated by reason of their interconnection through sprocket chain 30. Thereupon, the transverse elements 24, along with cylindrical member 20 connected thereto, will be accordingly raised or lowered. Thus, the height of the weir forming edge of member 20 may be readily adjusted to vary, as desired, the height of the liquid maintained in compartment 23 for a purpose which will be more apparent from the description hereinafter.

As will become apparent, the height of the liquid in the compartment 23 determines the premeasured volume of liquid dispensed by the liquid dispensing units mounted in such compartment. To maintain liquid in compartment 23 at the height of the upper edge of cylindrical member 20, a pump 40 is provided to withdraw liquids from reservoir 22 and supply it to compartment 23 in excess of the liquid quantity or volume required by the plurality of dispensing units during the filling operation. The excess liquid flows over the weir forming edge of member 20, back into reservoir 22, thereby maintaining a substantially constant level in compartment 23, as determined by the vertical height of member 20 as adjusted by manipulation of handwheel 31.

Figure 3:
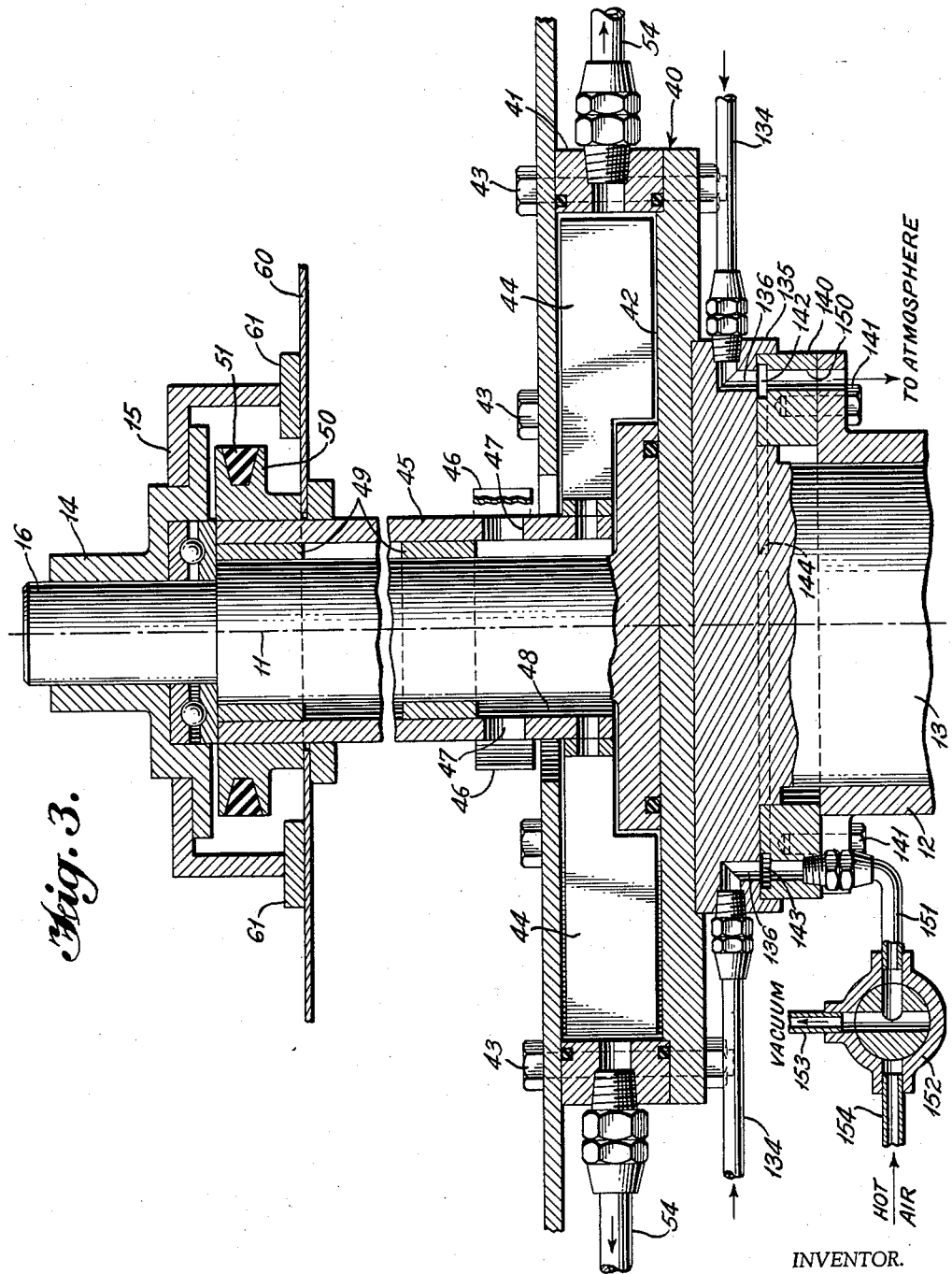
Figure 3 is a detail sectional view of the center support column of the machine and related parts.

The details of pump 40 are more clearly shown in Figure 3. Such pump includes a cylindrical housing 41 closed by a plate 42 and secured to the bottom of reservoir 22 by bolts 43. The pump impeller has a series of radial blades 44 secured at their inner ends to a sleeve 45. A series of liquid scoops 46 are secured to sleeve 45 to promote flow of liquid through inlets 47 downwardly through annular channel 48 and thence to the impeller housing to be propelled outwardly by blades 44.

Sleeve 45 is rotatably mounted on center support column 16 as by means of suitable bushings 49. A drive pulley 50 is attached to the upper end of sleeve 45. The pump 40 may be suitably driven through pulley 50 as by means of a belt 51 driven through a speed reducer 52 from an electric motor 53 mounted on the transverse frame member 15. By such positioning and driving connection for the pump, it will be seen that operation of the pump from the stationarily mounted motor 53 is not obstructed by rotation of tank 10 during filling operations.

The cylindrical housing 41 is provided with a plurality of radial liquid outlets, to which are connected tubes 54. As shown in Figure 2, these tubes communicate with compartment 23 to conduct liquid from pump 40 to such compartment.

With further reference to the structure of the instant invention as it pertains to maintaining in proper condition the liquid material which is to be dispensed by the filling machine, it will be noted that the upper wall of tank 10 is formed by annular wall portion 28 and a circular central cover 60. Cover 60 is nonrotatably supported by connection to frame member 15 through parallel transverse bars 61 extending across the cover.

The radially inner edge of top wall portion 28 is provided with an upwardly facing groove 62. The outer periphery of circular cover 60 has a downwardly directed flange 63 which is received in groove 62. A suitable liquid 64 is provided in groove 62 to offer a liquid seal, precluding entrance and exit of air through the joint between cover 60 and top wall portion 28. Thus, wall portion 28 rotates as an element of tank 10 relative to stationary cover 60 during operation of the machine.

Stationary cover 60 has mounted thereon a suitable cannister-type filter 65, which may be of the silica gel type, to permit the tank to breathe during the filling operation but exclude entrance of undesired moisture into the tank.

To replenish the liquid supply in reservoir 22, a liquid supply conduit 66 extends through cover 60. Liquid flow into the tank is controlled by a valve 67 actuated in response to movements of a float 68 to maintain a generally uniform amount of liquid in reservoir 22.

A coil 70 is mounted within reservoir 22 to be positioned beneath the normal liquid level therein. Such coil is supported on cover 60. In utilization of the rotary filling machine of this invention, a refrigerated gas or fluid may be conducted through coil 70 where the filling machine is performing filling operations in connection with materials desirably refrigerated during their handling. On the other hand, where the liquid material being dispensed is to be maintained at an elevated temperature, a heating fluid may be passed through coil 70 to maintain the liquid being dispensed at the desired temperature.

Figure 5:
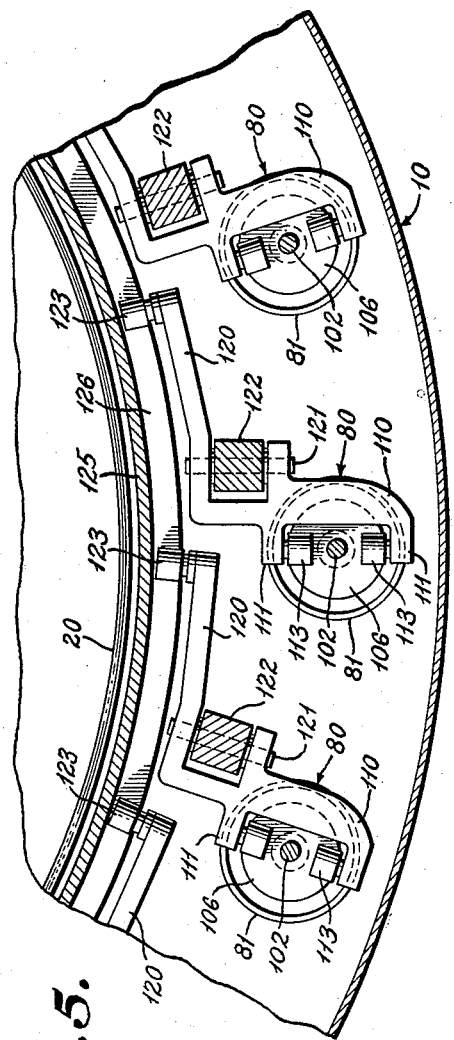
Figure 5 is a detail plan view with parts in section showing the operating mechanism for the dispensing unit valve assembly.

Each of the filling stations of the rotary filling machine is provided with a liquid dispensing unit 80. The construction and operation of these units in functioning of the machine are more clearly shown in Figures 2, 5 and 6. The individual units are secured at circumferentially spaced positions in apertures formed in the bottom wall of compartment 23.

Referring specifically to Figure 6, the dispensing units include a tubular wall member 81 which is open at its upper end and has a valve assembly at the lower end thereof to control flow of liquid into and out of the inlet and outlet of the unit. Wall member 81, together with the valve assembly at its lower end, forms a measuring chamber 82. The premeasured or predetermined volume of liquid to be dispensed into each container as it is filled is determined by the height of liquid assumed in chamber 82. Since the units 80 are mounted in compartment 23, the liquid height in compartment 23 in turn determines the liquid level assumed in chamber 82 when the inlet to such chamber is opened.

The valve assembly for each unit 80 includes an element 85 providing radial liquid inlets 86 and an axial liquid outlet 87. This element closes the lower end of tubular wall member 81 and has formed therein a valve seat 88 for inlets 86 and a valve seat 89 for outlet 87. Element 85 is provided with a flange 90 to attach the unit 80 to the bottom of compartment 23 by bolts 91. A suitable O-ring seal 92 may be provided intermediate flange 90 and the bottom of compartment 23, to preclude leakage of liquid from the compartment around the individual units 80.

A valve member 95 having a cylindrical guide portion 96 is provided to cooperate with seat 88 in closing inlets 86. The guide portion 96 cooperates with a cylindrical wall portion 97 formed in element 85 to maintain valve member 95 aligned with valve seat 88 during its opening and closing movements. A passage 98 extends through valve member 95 to permit liquid to flow from chamber 82 downwardly through outlet 87. Suitable O-ring packings 99 may be provided on the exterior of valve member 95 to sealingly engage with the parts of element 85 in the valve closing position.

A valve member 100 having a generally spherical configuration, as shown on the drawing, is provided to cooperate with valve seat 89 for outlet 87.

As a part of the valve assembly, the operators for the valve members 95 and 100 include a sleeve 101 connected at its lower end to valve member 95 and a rod 102 connected to valve member 100. Suitable sleeve bushings 103 are provided intermediate sleeve 101 and rod 102 to maintain these elements in alignment. An apertured guide plate 104 is mounted on the underside of top wall portion 28 immediately above rod 102. The upper end of such rod guidingly engages in the aperture of plate 104 to insure proper axial movement in opening and closing of the valve assembly.

Sleeve 101 has secured to its upper end a collar 105. A collar 106 is secured to rod 102 and a compression coil spring 107 interposed between collars 105 and 106. It will be readily appreciated that the coil spring 107, through its action on collars 105 and 106 secured to sleeve 101 and rod 102, respectively, tends to move the valve members 95 and 100 toward inlet and outlet closing positions.

Upward movement of valve member 95 effects opening of inlet 86 to admit liquid from compartment 23 into chamber 82. Such upward movement is achieved by applying upward force to the underside of collar 105. During such movement spring 107 is further compressed, with the added spring force being transmitted as upward force on the underside of collar 106. This upward force in turn tends to more firmly seat valve member 100 on valve seat 89 of outlet 87. Conversely, in opening outlet 87 downward force is applied to the upper surface of collar 106, whereupon spring 107 is compressed and the added spring force applied to the upper surface of collar 105 to more assuredly seat valve member 95 on valve seat 88 to close inlet 86. Thus, it is clearly apparent that in this simplified valve assembly, opening one valve causes more effective seating of the other valve, thus assuring proper valve operation.

The valve assembly operating mechanism includes a yoke 110. As shown more clearly in Figures 2, 5 and 6, the yoke is provided with a pair of projections 111 at the upper end thereof and a similar pair of projections 112 at the lower end thereof. The upper projections 111 rotatably support a pair of rollers 113, while the lower projections 112 rotatably support corresponding rollers 114. The paired rollers 113 and 114, carried by yoke 110, alternately engage with the upper surface of collar 106, in effecting opening of valve member 100, or with the lower surface of collar 105, in effecting opening of valve member 95.

Yoke 110 has a lever arm 120 which carries a mounting pin 121 to pivotally support the yoke adjacent collars 105 and 106 in a position to effect its intended valve assembly operating function. A mounting pillar 122, extending vertically between top wall portion 28 and the bottom of compartment 23, is provided for engagement with pin 121 in the pivotal mounting of yoke 110. The outer end of lever arm 120 is provided with a roller 123 rotatably mounted thereon.

The stationary circular cover 60 has secured on the underside thereof a cylindrical member 125. This member provides a radially outwardly facing cam track 126, in which the roller 123 of each of the dispensing units moves, upon rotation of tank 10. As shown more clearly in Figure 2, the vertical spacing of track 126 beneath cover 60 varies around the circumference of cylindrical member 125. The change in level of track 126, as shown at 127, changes the position of yoke 110 through the medium of lever arm 120 and, accordingly, effects appropriate operation of the dispensing unit valve assemblies for the filling operation.

Referring to Figures 2 and 6, the alternative extreme positions for the valve assembly in the dispensing units 80 is shown by comparison. The unit 80, shown on the right of these two figures, has the valve member 95 in its open position for admission of liquid through inlet 86 to chamber 82 while valve member 100 is closed. On the other hand, the left unit 80 in these figures is shown with valve member 95 closed and valve member 100 open to discharge liquid from chamber 80 through outlet 87.

With the roller 123 of the dispensing unit at the right in Figure 2 engaged in track 126 as shown, the yoke 110 and rollers 113 and 114 are moved to their uppermost position, whereupon rollers 114 lift valve member 95 through the intermediary of collar 105 and sleeve 101. In such position, rollers 113 move out of engagement with collar 106, while spring 107 urges such collar to its uppermost position and thereby urges valve member 100 firmly against its seat 89. As tank 10 rotates, roller 123 of this dispensing unit moves along in track 126 to point 127, where a change in level of the track occurs, thereby moving yoke 110 from its uppermost position downwardly to its lowermost position.

As shown at the left in Figures 2 and 6, the yoke has assumed its lowermost position, wherein rollers 113 bear against the upper surface of collar 106 to move the collar, rod 102 and valve member 100 downwardly and effect opening of outlet 87. In this position of yoke 110, rollers 114 are out of contact with collar 105 such that spring 107 tends to force valve member 95 downwardly to close inlet 86.

From the above-described structure, it will be readily apparent that as tank 10 is rotated in utilization of the machine in a filling operation, the valve assembly of each dispensing unit in succession is operated to initially open inlet 86 and permit the liquid to flow into chamber 82, where it assumes a level equal to that of compartment 23. At this time, outlet 87 is closed by valve member 100. When chamber 82 is filled with the premeasured volume of liquid, and as tank 10 rotates, inlet 86 is closed by valve member 95 and subsequently outlet 87 opened by downward movement of valve member 100. Thereupon, the liquid in chamber 82 flows outwardly to the container being filled.

Each dispensing unit has positioned beneath outlet 87 and secured to the underside of element 85, a dispensing nozzle 130. Nozzle 130 has a tubular outlet element 131 through which the liquid material flows into the container being filled. For use of the rotary filling machine where a vacuum-assisted filling is employed, there is provided an annular resilient gasket 132 encircling the tubular element 131. As shown in Figure 6, this gasket sealingly cooperates with the upper lip of the container C being filled, when vacuum is applied to assist in a rapid liquid filling operation.

An annular passage 133 surrounding tubular element 131 is incorporated in the dispensing nozzle 130. By means of a conduit 134, this annular passage may be selectively coupled to apply vacuum where vacuum-assisted filling is desired, to communicate ambient atmospheric pressure to the container interior following vacuum filling, so that the container may be readily removed from the filling station, or, where refrigerated materials are being dispensed, to supply heated dry gas in the form of air or inert gas to preclude frosting of the dispensing nozzle.

Particularly for use where vacuum-assisted liquid filling is to be performed, there is provided automatic valving mechanism to apply vacuum through conduit 134 to passage 133 while the container is in sealing engagement with gasket 132 and during the actual discharge of liquid into the container followed by release of the vacuum prior to separation of the container from engagement with nozzle 130.

Referring to Figure 3, a disc 135 is mounted on the underside of plate 42 of the pump 40 so that such disc will rotate with tank 10 and the parts carried thereby. The conduit 134 from each of the dispensing units 80 extends radially inwardly and is connected to a port 136 in disc 135. The ports 136 for each dispensing unit 80 are arrayed on disc 135 in a circle.

A valve ring 140 is connected by bolts 141 to stationary sleeve 12. Ring 140 is received in an annular recess formed in the underside of disc 135. Such ring has a first arcuate groove 142 formed in the circumference of a circle corresponding to the diameter of the circle in which ports 136 are disposed and a second arcuate groove 143 formed in the circumference of a similar diameter circle. The grooves 142 and 143 are separated at their adjacent ends by partitions 144. Groove 142 communicates with ambient atmosphere through port 150. Groove 143 is connected by conduit 151 with a valve 152. Valve 152 enables selective connection of conduit 151 with a source of vacuum (not shown) through tube 153 or a source of heated dry air or inert gas (not shown) through tube 154.

It will be readily appreciated that upon rotation of tank 10, which carries with it as a part thereof disc 135, the ports 136, which overlie groove 142 at any particular point, in rotation of the tank, will be in communication through port 150 with atmosphere. Similarly, those ports 136 which overlie groove 143 at any particular point in rotation of the tank will be in communication through conduit 151 with either vacuum or the heated dry air supply, depending upon the position of valve 152. As the tank rotates and ports 136 move across partition 144 from groove 142 into communication with groove 143, the flow through the conduit 134 communicating with such ports will change in character. A similar change will take place as the tank rotates, moving ports 136 from communication with groove 143 across partition 144 into communication with groove 142.

The operation of the apparatus will be readily apparent from the description of the structure as hereinabove set forth. The level of track 126 at the various points around its circumference will be made to operate the valve assemblies of dispensing units 80 to effect opening of inlet 86 for flow of liquid into each unit 80, while the unit is moving from the point of removal of the filled containers to the point of introduction of an empty container beneath the unit.

Where vacuum-assisted filling is employed, valve 152 will be positioned as shown in Figure 3. Those dispensing units 80 approaching the filled container removal point and leaving the point of introduction of an empty container will communicate, by reason of the arcuate length of groove 142, with ambient atmosphere. When the container has been raised into sealing engagement with gasket 132, vacuum will be applied by reason of the conduits 134 communicating through their ports 136 with groove 143. The application of this vacuum will continue during rotation of the particular dispensing unit until the unit approaches the filled container removal point. While vacuum is applied, the height of track 126 will be formed to effect closing of the inlet and opening of the outlet for dispensing units beneath which an empty container is positioned.

Where a refrigerated liquid material is being handled by the filling machine, such refrigeration will be maintained by the passage of a suitable refrigerating medium through coil 70. In such operation, it is desired that the container be withheld from sealing engagement with gasket 132 so that heated dry gas such as air or an inert gas may be passed through passage 133 in the dispensing nozzle to prevent frosting of the nozzle. Such heated dry gas produces only a minimum amount of localized heating of the tubular element 131 such as not to objectionably effect the refrigerated liquid being dispensed. On the other hand, the heated dry gas shields the tubular element 131 from contact with the surrounding humid atmosphere to preclude frost formation thereon. In carrying out this operation, the valve 152 is operated to connect conduit 151 with tube 154, whereupon the heated dry gas is applied to the dispensing nozzles during the filling operation. Since the container is not in contact with the dispensing nozzle during filling with a refrigerated liquid material, if desired, the heated dry gas may be continuously applied to the passage 133 to preclude frost formation on the nozzle.

Having thus described my invention, I claim:

1. A rotary multistation liquid filling machine comprising a tank mounted for rotation about a vertical axis, said tank having a cover including means hermetically sealing the tank and excluding moisture to avoid contamination of the contents of the tank, a vertically movable wall member within said tank forming a weir between a main liquid reservoir and an annular liquid compartment in said tank, pump means for supplying liquid from said reservoir to said compartment to overflow said wall member and thereby provide a predetermined liquid level in said compartment, a plurality of liquid dispensing units mounted in said compartment to provide liquid dispensing nozzles arranged in a circle around the axis of rotation, each unit including a measuring chamber provided with a liquid inlet and a liquid outlet, a dispensing nozzle communicating with said outlet, a valve assembly mounted to selectively control liquid flow into and out of said chamber including an inlet valve member and an inlet valve seat to control said liquid inlet and an outlet valve member and an outlet valve seat to control said liquid outlet, said inlet valve member moving downwardly to close said inlet and said outlet valve member moving upwardly to close said outlet, spring means cooperating with said valve members urging said members to close said inlet and said outlet, and valve assembly actuating means operable in response to rotary movement of said tank to sequentially open and close said inlet by raising said inlet valve member and thereafter lowering said inlet valve member and open and close said outlet by lowering said outlet valve member and thereafter raising said outlet valve member to dispense a premeasured volume of liquid into the container being filled.

2. A rotary multistation liquid filling machine as recited in claim 1 wherein said pump means comprises an impeller mounted in a housing and rotatable about the axis of rotation of said tank, means stationarily mounted to drive said impeller irrespective of rotary movement of said tank, and means for conducting liquid from said pump as withdrawn from said reservoir to said compartment.

3. A rotary multistation liquid filling machine as recited in claim 1 wherein said valve assembly actuating means includes a yoke having a lever arm pivotally mounting said yoke, said yoke having oppositely facing valve operating surfaces, an operating element carried by each of said valve members and positioned to be actuated by one of said surfaces, a cam track stationarily mounted adjacent said lever arm, and means on said lever arm engaging said track to move said yoke under control of said track and thereby effect actuation of said valve assembly in opposition to said spring means upon rotation of said tank.

4. A rotary multistation liquid filling machine comprising a tank mounted for rotation about a vertical axis, said tank having a vertically movable wall member therein forming a weir between a main liquid reservoir and an annular liquid compartment in said tank, pump means for supplying liquid from said reservoir to said compartment to overflow said wall member and thereby provide a predetermined liquid level in said compartment, a plurality of liquid dispensing units mounted in said compartment to provide liquid dispensing nozzles arranged in a circle around the axis of rotation, each unit including a measuring chamber provided with a liquid inlet and a liquid outlet, a dispensing nozzle communicating with said outlet, a valve assembly mounted to selectively control liquid flow into and out of said chamber including a valve member to control said liquid inlet and a valve member to control said liquid outlet, spring means cooperating with said valve members urging said members to close said inlet and said outlet, valve assembly actuating means within said tank operable in response to rotary movement of said tank to sequentially open said inlet and open said outlet to dispense a premeasured volume of liquid into a container being filled, said tank having as at least a part of the top wall thereof a stationary circular cover overlying the central portion of said tank, a liquid seal provided at the junction of said cover with the tank wall, and conduit means supported by said cover in said supply reservoir for the flow of a fluid medium to effect controlled temperature conditioning of the filling liquid as desired.

5. A rotary multistation liquid filling machine as recited in claim 4 wherein said valve assembly actuating means includes a yoke having a lever arm pivotally mounting the yoke for rotation with said tank, said yoke having oppositely facing valve operating surfaces, an operating element carried by each of said valve members and positioned to be actuated by one of said surfaces, a circular cam track mounted on said cover within said tank and adjacent said lever arm, and means on said lever arm engaging said track to move said yoke under control of said track and thereby effect actuation of said valve assembly in opposition to said spring means upon rotation of said tank.

6. A rotary multistation liquid filling machine as recited in claim 4 wherein said cover is provided with a moisture eliminating filter for passage of dehumidified air into and out of said tank.

7. A rotary multistation liquid filling machine comprising a tank mounted for rotation about a vertical axis, said tank having a vertically movable cylindrical wall member therein slidably engaging a vertical cylindrical wall portion of said tank to form a weir between a main liquid reservoir and an annular liquid compartment in said tank, pump means for supplying liquid from said reservoir to said compartment to overflow said wall member and thereby provide a predetermined liquid level in said compartment, a plurality of liquid dispensing units mounted in said compartment in a circle around the axis of rotation of said tank, each of said units including a measuring chamber provided with a liquid inlet and a liquid outlet, a valve assembly mounted to selectively control liquid flow into and out of said chamber, means connected to operate said valve assembly in response to rotary movement of said tank to sequentially open and close said inlet and open and close said outlet to dispense a premeasured volume of liquid into a container being filled, a dispensing nozzle communicating with the outlet of said measuring chamber, said nozzle having an annular passage encircling the discharge opening of said nozzle, conduit means communicating with said passage, and valving means associated with said conduit means to couple said conduit means with a source of inert dry gas to preclude frost formation on the nozzle by flow of such gas around the discharge opening.

8. In a rotary multistation liquid filling machine, a liquid dispensing unit at each station for discharging a premeasured volume of liquid into the container to be filled, said unit comprising a measuring chamber to retain a premeasured volume of liquid therein, said chamber having an inlet and an outlet, a dispensing nozzle communicating with said outlet and cooperable with a container to be filled, an inlet valve member movable in one direction to close said inlet, an outlet valve member movable in the opposite direction to close said outlet, spring means connected to bias said valve members toward positions closing said inlet and said outlet, an operating element carried by each of said valve members, a yoke having a lever arm pivotally mounting the yoke adjacent the operating elements, said yoke having oppositely facing valve operating surfaces with one of said surfaces positioned adjacent each operating element, a cam track stationarily mounted adjacent said lever arm, and means on said lever arm engaging said track to move said yoke under control of said track and thereby effect actuation of said valve members in opposition to said spring means.

9. In a rotary multistation liquid filling machine, a liquid dispensing unit at each station for discharging a premeasured volume of liquid into the container to be filled, said unit comprising a tubular wall member closed at its lower end by an element providing a radially extending liquid inlet and an axially extending liquid outlet, a first valve member guided by said element for movement to control liquid flow through said inlet, a second valve member to control liquid flow from said chamber through said outlet, a dispensing nozzle communicating with said outlet and cooperable with a container to be filled, a sleeve connected to said first valve member and extending axially upwardly through said tubular wall member, a rod connected to said second valve member and extending axially upwardly through said sleeve, a collar secured to the upper ends of each of said sleeve and said rod, a spring interposed between the collars to urge said valve members toward positions closing said inlet and said outlet, and operating means alternately engageable with the upwardly facing surface of one of said collars and the downwardly facing surface of the other of said collars to effect opening of said inlet and said outlet independent of each other.

10. In a rotary multistation liquid filling machine, a liquid dispensing unit as recited in claim 9 wherein said operating means includes a yoke provided with oppositely facing valve operating surfaces engageable with the aforementioned surfaces of said collar, and said yoke has a lever arm provided with means for pivotally mounting said yoke whereby movements of said yoke to effect alternate opening of said inlet and said outlet may be achieved by guided movements of said lever arm.

11. In a rotary multistation liquid filling machine, a liquid dispensing unit as recited in claim 10 wherein said valve operating surfaces are provided by rollers carried by said yoke and said lever arm is provided with a roller for guiding engagement with a cam track to control movements of said yoke in accomplishing inlet and outlet liquid flow control from said chamber during filling.

12. In a rotary multistation liquid filling machine, a liquid dispensing unit as recited in claim 9 wherein guide means are provided to retain the upper end of said rod to assure proper alignment of said rod and sleeve in opening and closing movements of the valve members carried thereby.

References Cited in the file of this patent
UNITED STATES PATENTS

| | | |
|---|---|---|
| 1,965,246 | Meyer | July 3, 1934 |
| 1,978,002 | Weaver | Oct. 23, 1934 |
| 2,174,745 | Hoffman et al. | Oct. 3, 1939 |
| 2,232,273 | Risser | Feb. 18, 1941 |
| 2,360,198 | Carter | Oct. 10, 1944 |
| 2,703,666 | Iannelli | Mar. 8, 1955 |
| 2,706,589 | Bingham | Apr. 19, 1955 |
| 2,756,916 | Kerr | July 31, 1956 |
| 2,779,358 | Fechheimer et al. | Jan. 29, 1957 |